US010895900B2

(12) United States Patent
Waterton et al.

(10) Patent No.: US 10,895,900 B2
(45) Date of Patent: Jan. 19, 2021

(54) POWER MANAGEMENT BASED ON RFID DATA

(71) Applicant: International Business Machines Corporation, Armonk, NY (US)

(72) Inventors: Thomas J. Waterton, Southampton (GB); Henry J. Collinson, Eastleigh (GB); Christopher J. Poole, Romsey (GB); Julie E. Stalley, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 16/162,854

(22) Filed: Oct. 17, 2018

(65) Prior Publication Data

US 2020/0125154 A1 Apr. 23, 2020

(51) Int. Cl.
*G06F 1/30* (2006.01)
*G06K 7/10* (2006.01)

(52) U.S. Cl.
CPC ........... *G06F 1/30* (2013.01); *G06K 7/10366* (2013.01)

(58) Field of Classification Search
CPC combination set(s) only.
See application file for complete search history.

(56) References Cited

U.S. PATENT DOCUMENTS

| 5,872,984 | A | * | 2/1999 | Berglund | G06F 1/263 307/66 |
| 7,251,738 | B2 | * | 7/2007 | Stedman | G06F 1/3203 713/300 |
| 8,849,596 | B2 |   | 9/2014 | Ting et al. | |
| 8,930,158 | B2 |   | 1/2015 | Elberbaum | |
| 8,949,971 | B2 |   | 2/2015 | Tribble | |
| 9,520,043 | B1 | * | 12/2016 | Alshinnawi | G08B 21/182 |
| 9,569,647 | B2 |   | 2/2017 | Allen et al. | |
| 2006/0206741 | A1 | * | 9/2006 | Allison | G06F 1/266 713/340 |
| 2008/0133955 | A1 | * | 6/2008 | Westerfield | G06F 11/006 713/340 |
| 2010/0013314 | A1 | * | 1/2010 | Groff | H02J 9/061 307/66 |
| 2012/0192007 | A1 | * | 7/2012 | Weilnau, Jr. | G06F 1/30 714/14 |

(Continued)

FOREIGN PATENT DOCUMENTS

KR 100927337 B1 11/2009

OTHER PUBLICATIONS

Universal Serial Bus, "USB Power Delivery", printed Aug. 15, 2018, 3 pages http://www.usb.org/developers/powderdelivery/.

(Continued)

*Primary Examiner* — Raymond N Phan
(74) *Attorney, Agent, or Firm* — James L. Olsen

(57) ABSTRACT

Aspects of the present disclosure relate to managing power provided to devices. A first set of radio-frequency identification (RFID) power data can be read, by an RFID reader, from a first RFID tag of a first device electrically coupled to a power supply. The first set of RFID power data can specify a first amount of energy required by the first device if a power loss occurs. An indication that a power loss occurred can be received. In response to the indication that the power loss occurred, the power supply can provide the first amount of energy to the first device.

14 Claims, 8 Drawing Sheets

(56) References Cited

U.S. PATENT DOCUMENTS

| | | | |
|---|---|---|---|
| 2013/0041519 A1* | 2/2013 | Feldstein | H02J 3/14 |
| | | | 700/297 |
| 2013/0154808 A1 | 6/2013 | Han et al. | |
| 2013/0178996 A1* | 7/2013 | Li | G06F 1/30 |
| | | | 700/295 |
| 2013/0222119 A1* | 8/2013 | Tietke | G06K 7/0008 |
| | | | 340/10.5 |

OTHER PUBLICATIONS

Electronic Design, "Introduction to USB Power Delivery", printed Aug. 15, 2018, 6 pages https://www.electronicdesign.com/interconnects/introduction-usb-power-delivery.

O'Connor, M., "TalkingPlug Uses RFID-Enabled Power Outlets for Energy Management", printed Jul. 28, 2018, 2 pages.

Louizr et al., "RFID based solution for the sensing of home electrical devices activity", 2016 International Symposium on Antennas and Propagation (ISAP), Oct. 24-28, 2016, pp. 1002-1003.

* cited by examiner

POWER MANAGEMENT BASED ON RFID DATA

BACKGROUND

The present disclosure relates generally to the field of electronics, and in particular to managing power provided to devices.

Power supplies (e.g., uninterruptible power supplies (UPSs)) and extension cables (e.g., power strips) are configured to provide power from a source to one or more sinks (e.g., devices). Several devices (e.g., televisions, light sources, computer systems, appliances, etc.) can be powered via a single power supply or extension cable.

SUMMARY

Embodiments of the present disclosure relate to a system, method, and computer program product for managing power provided to devices.

In embodiments, a first set of radio-frequency identification (RFID) power data can be read, by an RFID reader, from a first RFID tag of a first device electrically coupled to a power supply. The first set of RFID power data can specify a first amount of energy required by the first device if a power loss occurs. An indication that a power loss occurred can be received. In response to the indication that the power loss occurred, the power supply can provide the first amount of energy to the first device.

In embodiments, a first RFID tag of a first device can be read by an RFID reader of a power distributor to determine a first power draw of the first device. A second RFID tag of a second device can be read by the RFID reader to determine a second power draw of the second device. A determination can be made that an addition of the first and second power draw are within a power limit of the power distributor. Power can then be provided to the first and second devices.

In embodiments, a first RFID tag of a first device can be read to determine a first voltage requirement of the first device. A second voltage requirement of a power distributor can be determined. A determination can be made that the first and second voltage requirements are different. Power may not be provided to the first device based on determining that the first and second voltage requirements are different.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
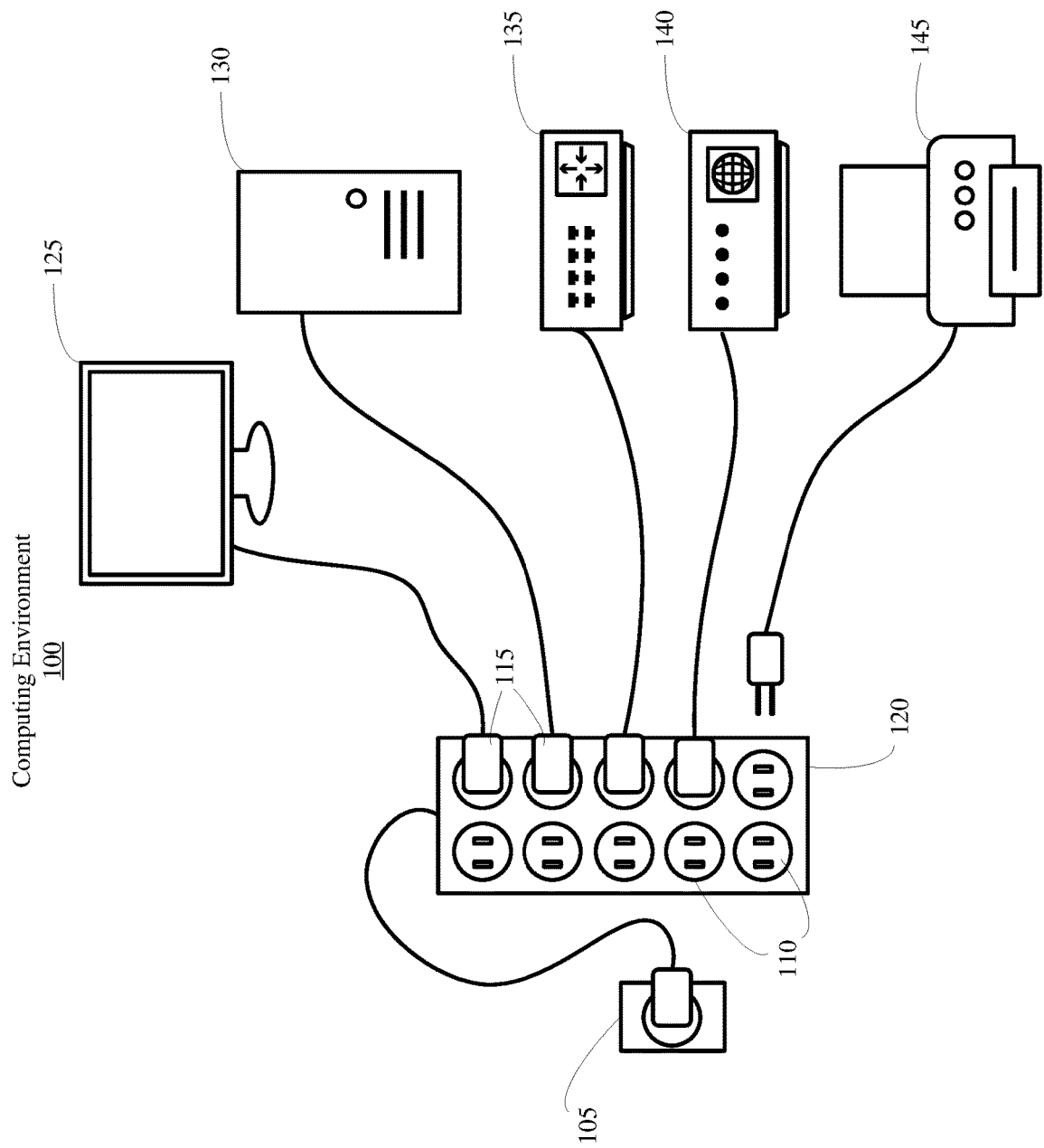
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of electronics, and in particular to managing power provided to devices. While the present disclosure is not necessarily limited to such applications, various aspects of the disclosure can be appreciated through a discussion of various examples using this context.

Extension cables and power supplies (collectively "power distributors") can be configured to transport power from power sources (e.g., mains electricity, batteries, solar panels, etc.) to one or more devices. When plugging multiple devices into a power distributor, it can be difficult to know whether the distributor is overloaded. This is particularly the case if some of the devices are not yet turned on and/or are not drawing their peak power (e.g., if a device is in standby mode or is not currently being utilized). Further, it can be time consuming to determine whether particular electronic devices are compatible with electric utility standards. For example, European devices may not be compatible with US outlets (e.g., or US power distributors), and US devices may not be compatible with European outlets. A user can be required to manually check (e.g., via a power meter, volt meter, amp meter, etc., or by referencing electrical information associated with each device) the power characteristics of each device to make informed, safe, decisions when loading a power distributor. For example, by knowing the peak power draws, current draws, voltage standards, etc. of devices, power distributors can be properly loaded.

Having precise knowledge about power characteristics for devices is similarly beneficial for uninterruptible power supplies (UPS's). UPS's are configured to continue supplying power to all devices connected to the UPS in the event of a power loss (e.g., an electrical grid outage). If a power loss does occur, the UPS can provide ample time for connected devices to complete a safe shutdown (e.g., finishing updates, backups, etc.). However, the amount of energy in a UPS can be limited (as a battery typically provides power after mains electricity is unavailable). Accordingly, knowing characteristics about the devices such as the energy (e.g., power over time) required to complete a safe shutdown, whether a safe shutdown is required, and/or the importance of each device can be beneficial. For example, an important device (e.g., a storage server containing important data) can be prioritized over one or more less important devices (e.g., gaming computers, printers, etc.) by a UPS when an outage occurs, ensuring the important device safely shuts down.

Aspects of the present disclosure relate to managing power provided to devices by analyzing radio-frequency identification (RFID) power data associated with each device. RFID tags can be embedded in each device electrically coupled to a power distributor. The RFID tags can include RFID power data indicating power characteristics, importance (e.g., priority data), safe shutdown data, and the like for respective devices. The RFID power data can be read by the power distributor, and the power distributor can issue actions based on the RFID power data. For example, the power distributor can be configured to provide/block current flow (e.g., by opening or closing sockets), provide warnings/notifications, provide power to selective devices for specific time periods, etc.

Referring now to the figures, FIG. 1 is a diagram illustrating a computing environment 100, in accordance with embodiments of the present disclosure. The computing environment 100 includes a power distributor 120 electrically coupled to a wall socket 105 and a plurality of plugs 115. The power distributor 120 receives power from the wall socket 105 (e.g., mains electricity) and transmits the power to the plugs 115 through a plurality of sockets 110. A monitor 125, computer 130, router 135, and modem 140 (herein collectively "connected devices") receive power through the plugs 115. A printer 145 is not currently connected to the power distributor 120.

In embodiments, the power distributor 120 can be a power supply. The type of power supply can vary depending on the electrical environment. For example, the power distributor 120 can be a DC power supply, AC-to-DC power supply, switched-mode power supply (SMPS), linear regulator, AC power supply, programmable power supply, uninterruptible power supply, high-voltage power supply, bipolar power supply, etc. In some embodiments, the power distributor 120 can be an extension cord (e.g., a power strip containing a plurality of sockets in parallel connected to mains electricity).

In embodiments, the wall socket 105, sockets 110, plugs 115, and power distributor 120 (herein collectively "electrical components") can be configured based on any suitable electric standards. For example, the electrical components can be compatible with 120 single-phase voltage or 230 single-phase voltage. Further, the plugs/sockets can be any suitable type (e.g., type A-type O).

As depicted in FIG. 1, a variety of connected devices require power. The power characteristics (e.g., power draw, required voltage, frequency, etc.) can vary from component to component. For example, the monitor 125 may require 30 W (e.g., 120V and 0.25 A) while the computer 130 may require 300 W (e.g., 120V and 2.5 A). The power distributor 120 can be configured to provide required power to all components connected thereto.

In the computing environment 100, it can be difficult to know whether the power distributor 120 is capable of supporting (e.g., compatible with) the devices connected thereto. A user may be required to manually analyze each device to determine whether each device is compatible with the power distributor 120. Further, to ensure the power distributor 120 is not overloaded, the user may be required to manually check the power draw (e.g., via a power meter or by referencing electrical information associated with the devices) of each device to ensure the sum power draw (e.g., predicted load) does not exceed the power capabilities of the power distributor 120.

Aspects of the present disclosure address the aforementioned complications by storing power data for respective devices in RFID tags. The RFID tags (e.g., passive or active RFID) can transmit the power data for each device to the power distributor 120. The power distributor 120 can then issue actions based on the power data received from each device, to be discussed with reference to FIGS. 2-7.

Figure 2:
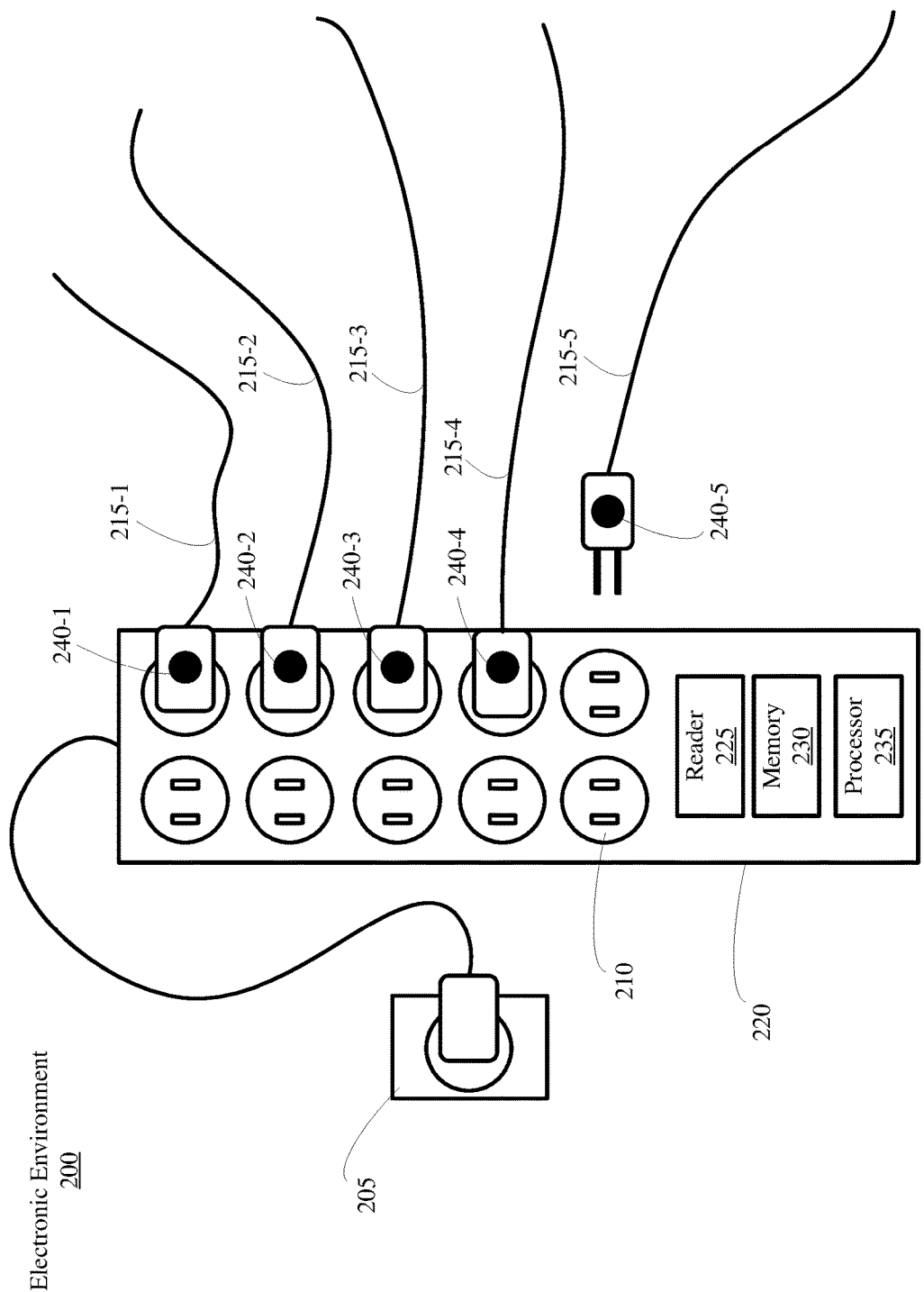
FIG. 2 is a block diagram illustrating an example electronic environment in which illustrative embodiments of the present disclosure can be implemented.

Referring now to FIG. 2, shown is a diagram of an electronic environment 200 in which illustrative embodiments of the present disclosure can be implemented. The electronic environment 200 includes a power distributor 220 having a plurality of sockets 210 electrically coupled to a wall socket 205. A first plug 215-1, a second plug 215-2, a third plug 215-3, a fourth plug 215-4, and a fifth plug 215-1 (herein collectively "plugs 215") are connected to sockets 210 of the power distributor 220. The first plug 215-1 includes a first RFID tag 240-1, the second plug 215-2 includes a second RFID tag 240-2, the third plug 215-3 includes a third RFID tag 240-3, the fourth plug 215-4 includes a fourth RFID tag 240-4, and the fifth plug 215-5 includes a fifth RFID tag 240-5. As discussed herein, the first RFID tag 240-1, second RFID tag 240-2, third RFID tag 240-3, fourth RFID tag 240-4, and fifth RFID tag 240-5 can be collectively referred to as "RFID tags 240."

As depicted in FIG. 2, the power distributor 220 includes a reader 225, a memory 230, and a processor 235. Upon plugging the plugs 215 into the sockets 210 of the power distributor 220, but prior to providing power, the power distributor 220 can be configured to read power data associated with each of the RFID tags 240 via the reader 225. The power distributor 220 can be configured to store the power data in the memory 230 and analyze the data using the processor 235. Based on the analysis, the processor 235 can issue one or more actions to the power distributor 220. In embodiments, these actions can include: providing power (e.g., via a relay or switch), disabling power (e.g., via a relay or switch), issuing notifications, and others. These actions can be completed based on individual sockets 210 or groups of sockets 210.

In some embodiments, the power data stored on the RFID tags 240 can include electrical characteristics for respective devices. Electrical characteristics can include, but are not limited to, required voltage, current draw, power draw, type of current (AC vs. DC), and/or frequency. In some embodiments, the power data can indicate power draw based on the state of the device. For example, the power data can specify peak power draw, idle power draw, average power draw, and/or power draw at particular operating states (e.g., high power mode, medium power mode, low power mode, etc.).

The electrical characteristics can be used to determine whether connected devices are compatible with the power distributor 220 (e.g., to be discussed with reference to FIG. 3). For example, assume the power distributor 220 is only configured to receive 120 single phase voltage devices. In this example, if the power distributor 220 reads the first RFID tag 240-1 associated with the first plug 215-1 of a first device, and the first RFID tag 240-1 (e.g., a first set of RFID power data stored on the first RFID tag 240-1) indicates that the first device requires 230 single phase voltage, a determination can be made that the first device is not compatible with the power distributor 220. The socket which the first plug 215-1 is coupled to (e.g., plugged in) can then be disabled to prevent damage to the power distributor 230 and/or the first device. This can be completed based on required voltage (e.g., 120V vs. 230V), frequency (60 Hz vs. 50 Hz), current type (e.g., AC vs. DC), and other electrical characteristics.

In embodiments, the electrical characteristics can be used to determine whether the power distributor 220 is capable of receiving an additional device (e.g., to be discussed with reference to FIGS. 4-5). For example, assume the power distributor 220 is capable of providing 1000 watts. Further, assume the first RFID tag 240-1 indicates that a first device draws 50 watts, the second RFID tag 240-2 (e.g., a second set of RFID power data stored on the second RFID tag 240-2) indicates that a second device draws 100 watts, the third RFID tag 240-3 indicates that a third device draws 500 watts, and the fourth RFID tag 240-4 indicates that a fourth device draws 200 watts. Upon plugging in the fifth plug 215-5 of a fifth device, the power distributor 220 can analyze the fifth RFID tag 240-5. If the fifth RFID tag 240-5 indicates that the fifth device draws any more than 150 watts, a determination can be made that the power distributor 220 is not capable of providing power to the fifth device. The socket in which the fifth device was coupled to can then be disabled (or can remain disabled if sockets are defaulted to "closed") to prevent overloading the power distributor 220.

In embodiments, the power data can include additional data which can be used to issue intelligent actions by the power distributor 220. For example, the power data can include the energy required for a safe shutdown, the relative importance of respective devices, whether a device requires a safe shutdown, etc. This power data can be used in prioritizing particular devices to be provided power (e.g., see FIGS. 5&7). Further, this power data can be used by a UPS in order to properly facilitate safe shutdowns if a power loss occurs (e.g., to be discussed further with respect to FIGS. 6-7).

Figure 3:
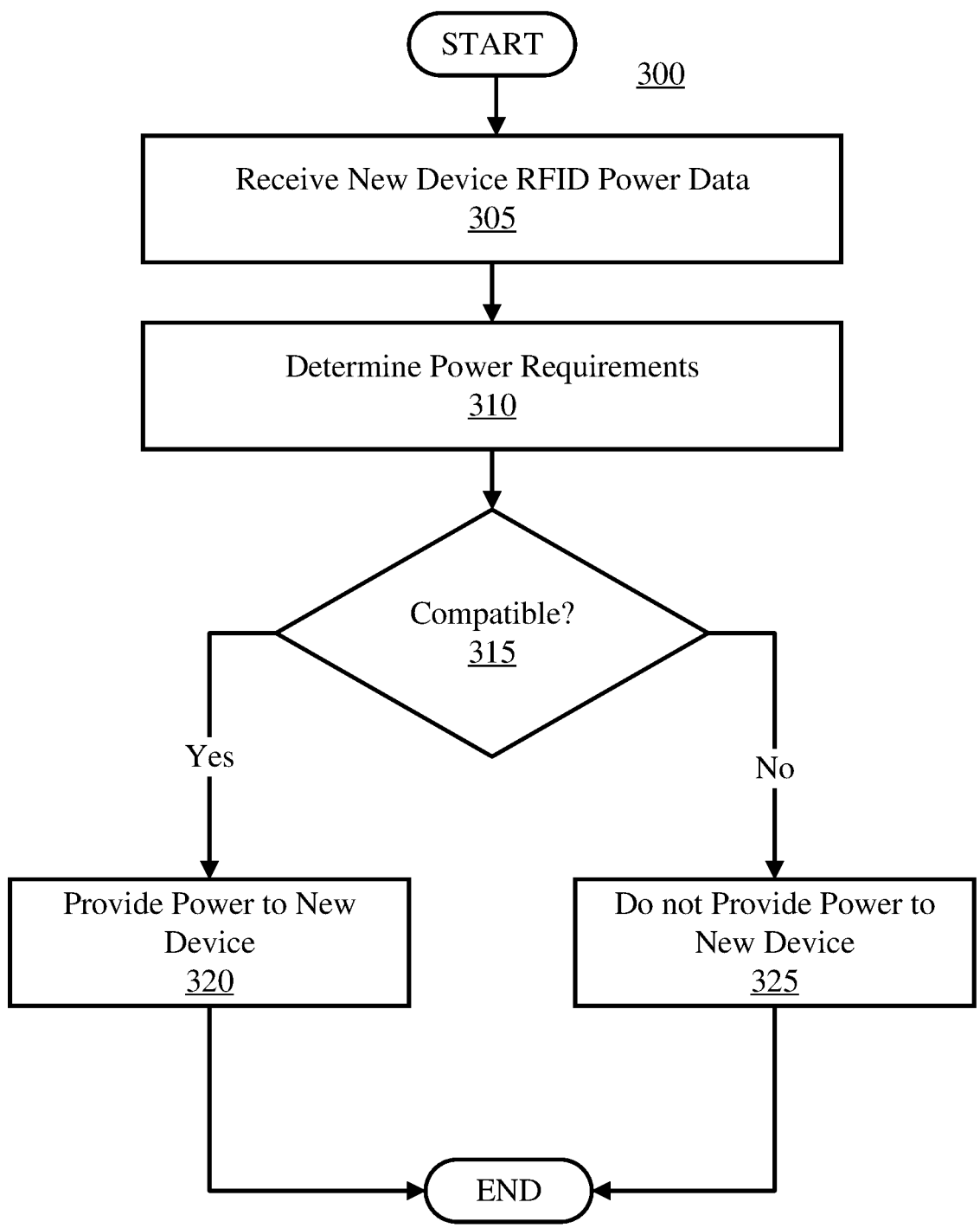
FIG. 3 is a flow diagram illustrating an example method for determining whether a new device is compatible with a power distributor, in accordance with embodiments of the present disclosure.

Referring now to FIG. 3, shown is a flow diagram illustrating a method 300 for determining whether a new device is compatible with a power distributor (e.g., power distributor 120 of FIG. 1 or power distributor 220 of FIG. 2). Method 300 initiates at operation 305, where new device RFID power data is received. Upon plugging the new device into the power distributor, but prior to providing power to the new device, an RFID reader embedded in the power distributor can read (e.g., receives) the RFID power data from the RFID tag on the new device's plug. The RFID power data can indicate power characteristics for the new device, such as the required voltage, frequency, type of current, and power draw.

Power requirements are then determined. This is illustrated at operation 310. In embodiments, the power requirements are predefined (e.g., user defined, defined by a manufacturer, etc.). The power requirements can be defined based on the surrounding infrastructure (e.g., A/C mains electricity). For example, in the United States, the mains electricity typically supplies 120 single-phase voltage at 60 Hz. Alternatively, in Europe, the mains electricity typically supplies 230 single-phase voltage at 50 Hz.

A determination is then made whether the new device is compatible with the power distributor. This is illustrated at operation 315. Determining whether the new device is compatible with the power distributor is completed by comparing the RFID power data of the new device received at operation 305 to the power requirements determined at 310. For example, if the power requirements specify that the voltage supply is required to be 120 volts, and the RFID power data of the new device specifies that the new device requires 230 volts, a determination can be made that the new device is not compatible with the power distributor.

If a determination is made that the new device is compatible with the power distributor, power is provided to the new device. This is illustrated at operation 320. This can be completed by enabling current flow through the socket the new device is plugged into. Current flow can be permitted/prevented via a relay, switch, etc. associated with the power distributor. In some embodiments, each socket can be defaulted as "open" (e.g., current flows to each new device upon each plug in). In these embodiments, the new device can continue to be provided power. In contrast, in embodiments in which each socket is defaulted as "closed" (e.g., no current flow), the socket the new device is coupled to can be opened in response to a determination that the power distributor and new device are compatible. In some embodiments, the default option (e.g., "open" vs. "closed") can be predetermined (e.g., set by a manufacturer). In some embodiments, the default option can be configurable by a user (e.g., the user can select the default option via a button, switch, etc.). After power is provided to the new device, method 300 terminates.

If a determination is made that the new device is not compatible with the power distributor, power is not provided to the new device. This is illustrated at operation 325. In embodiments, the socket which the new device is plugged into can remain deactivated. For example, a relay, switch, etc. associated with the socket the new device is plugged into can remain in an "off" state. However, in embodiments in which each socket is defaulted as "open," if a determination is made that the new device and power distributor are not compatible, then the socket the new device is coupled to can be deactivated. After power is not provided to the new device, method 300 terminates.

Though reference is made to not providing power to the new device at operation 325, in some embodiments, power can be provided to the new device and a warning can be issued at operation 325. Warnings can include audio or visual notifications. For example, if a determination is made that the new device and power distributor are incompatible, a light emitting diode (LED) associated with the socket (e.g., adjacent to the socket on the power distributor) the new device is plugged into can be activated.

The aforementioned operations can be completed in any order and are not limited to those described. Additionally, some, all, or none of the aforementioned operations can be completed, while still remaining within the spirit and scope of the present disclosure. For example, in some embodiments, operations 305 and 310 can be interchanged. That is, in some embodiments, the power requirements can be determined at operation 305 and the new device RFID power data can be received at operation 310.

Figure 4:
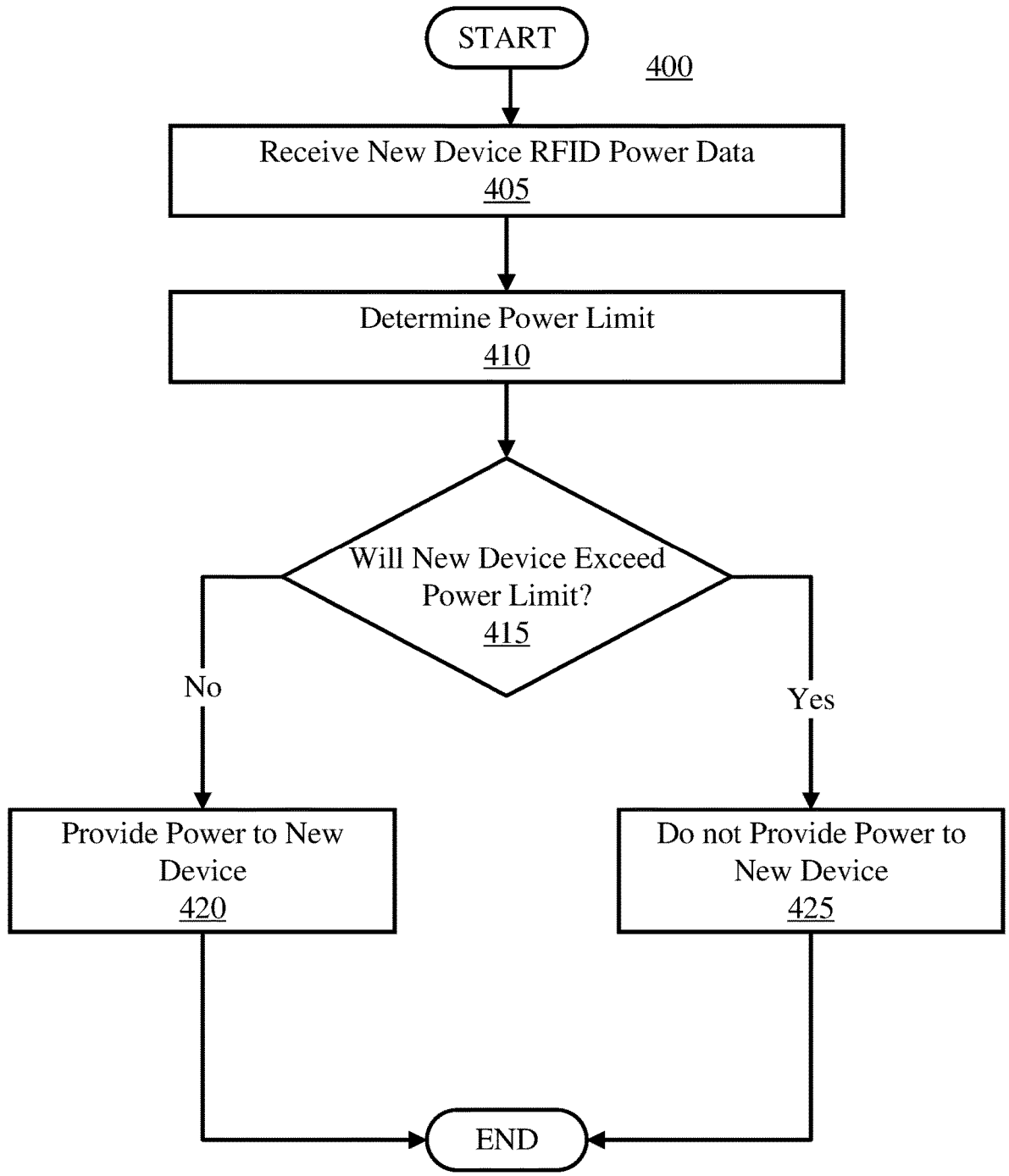
FIG. 4 is a flow diagram illustrating an example method for determining whether a power distributor is capable of providing power to a newly connected device, in accordance with embodiments of the present disclosure.

Referring now to FIG. 4, shown is a flow diagram of an example method 400 for determining whether a power distributor (e.g., power distributor 120 of FIG. 1 or power distributor 220 of FIG. 2) is capable of receiving a new device, in accordance with embodiments of the present disclosure. Method 400 initiates at operation 405, where new device RFID power data is received. Upon plugging the new device into the power distributor, but prior to providing power to the new device, an RFID reader embedded in the power distributor can read (e.g., receives) the RFID power data from the RFID tag on the new device's plug. The RFID power data can indicate power characteristics of the new device. Power characteristics can include, but are not limited to, required voltage, current draw, power draw, type of current (AC vs. DC), and/or frequency. In some embodiments, the RFID power data can indicate power draw based on the state of the device. For example, the power data can specify peak power draw, idle power draw, average power draw, and/or power draw at particular operating states (e.g., high power mode, medium power mode, low power mode, power draw at particular time periods, etc.).

A power limit is then determined. This is illustrated at operation 410. The power limit can be defined based on the amount of power the power distributor is capable of providing (e.g., handling), which can be defined by a user or manufacturer. In some embodiments, the power limit can be determined based on test data. For example, the power limit can be defined based on the power draw required to induce failure (e.g., the power draw which caused the power distributor to fail or caused a circuit breaker to trip). The power limit can be any suitable value (e.g., 500 W, 1,000 W, 2,000 W, etc.).

A determination is then made whether the new device will exceed the power limit. This is illustrated at operation 415. Determining whether the new device will exceed the power limit can be completed by comparing the predicted load (considering the addition of the new device) to the power limit. For example, assume a power distributor is currently drawing 800 W (e.g., as indicated by RFID power data of the one or more connected devices) with a power limit of 1,200 W. If the RFID power data of the new device indicates that the new device draws 300 W, then a determination can be made that the new device will not exceed the power limit (e.g., as 1,100 W falls below the 1,200 W power limit). In contrast, if the RFID power data of the new device indicates that the new device draws 500 W, then a determination can be made that the new device will exceed the power limit (e.g., as 1,300 W exceeds the 1,200 W power limit).

In some embodiments, the peak power draw (e.g., as indicated in the RFID power data) of each device is considered when comparing the predicted load of the power distributor to the power limit. This can be completed to ensure that, if all devices are operating under their maximum power draw, the power distributor is not overloaded. However, in some embodiments, the average power draw, idle power draw, etc. of respective devices can be considered when determining whether the power limit is exceeded.

If a determination is made that the addition of the new device does not exceed the power limit, then power is provided to the new device. This is illustrated at operation 420. This can be completed by enabling current flow through the socket the new device is plugged into. Current flow can be permitted/prevented via a relay, switch, etc. associated with the power distributor. In some embodiments, each socket can be defaulted as "open" (e.g., current flows to each new device upon each plug in). In these embodiments, the new device can continue to be provided power. In contrast, in embodiments in which each socket is defaulted as "closed," the socket the new device is coupled to can be opened in response to a determination that the power distributor is capable of powering the new device (e.g., a determination that the power limit is not exceeded upon the addition of the new device). After power is provided to the new device, method 400 terminates.

If a determination is made that the power distributor is not capable of providing power to the new device (e.g., the power limit is exceeded), then power is not provided to the new device. This is illustrated at operation 425. In embodiments, the socket which the new device is plugged into can remain deactivated. For example, a relay, switch, etc. associated with the socket the new device is plugged into can remain in an "off" state. However, in embodiments in which each socket is defaulted as "open," if a determination is made that the power distributor is not capable of providing power to the new device, then the socket the new device is coupled to can be deactivated (e.g., closed, switched off, etc.). After power is not provided to the new device, method 400 terminates.

Though reference is made to not providing power to the new device at operation 425, in some embodiments, power can be provided to the new device and a warning can be triggered at operation 425. Warnings can include audio or visual notifications. For example, if a determination is made that the power limit is exceeded upon the addition of the new device, an audio alarm can be triggered warning a user of the potential overload.

The aforementioned operations can be completed in any order and are not limited to those described. Additionally, some, all, or none of the aforementioned operations can be completed, while still remaining within the spirit and scope of the present disclosure. For example, in some embodiments, operations 405 and 410 can be interchanged. That is, in some embodiments, the power limit can be determined at operation 405 and the new device RFID power data can be received at operation 410.

Figure 5:
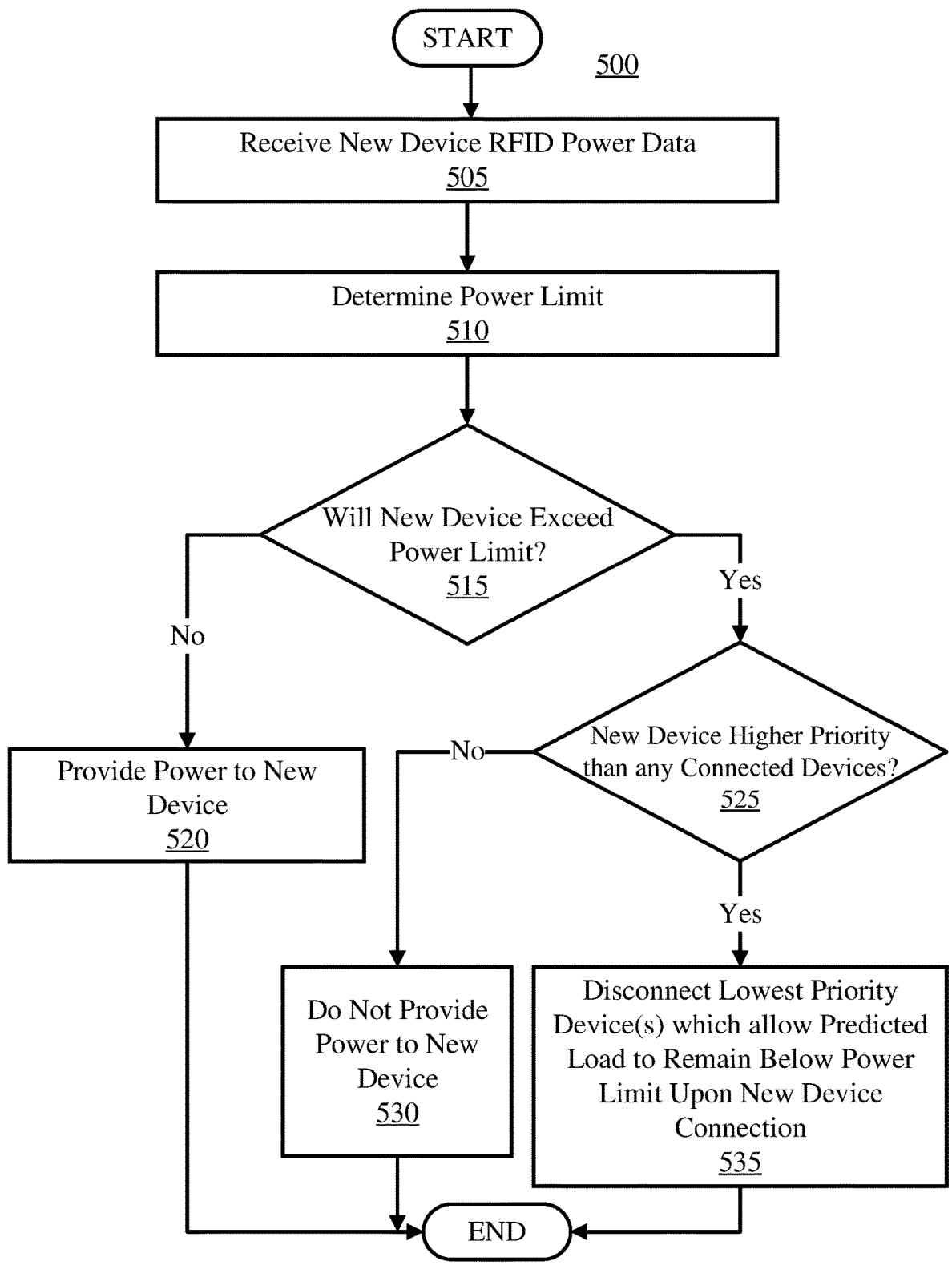
FIG. 5 is a flow diagram illustrating another example method for determining whether a power distributor is capable of providing power to a newly connected device, in accordance with embodiments of the present disclosure.

Referring now to FIG. 5, shown is a flow diagram of an example method 500 for determining whether to provide power to a newly connected device, in accordance with embodiments of the present disclosure. Method 500 initiates at operation 505, where new device RFID power data is received. The new device RFID power data can be received in the same manner as operation 305 of FIG. 3 or operation 405 of FIG. 4. In some embodiments, each set of RFID power data can include priority data for each respective device. The priority data can be used to determine which devices should be prioritized power (e.g., in the event the power distributor reaches capacity).

A power limit is then determined. This is illustrated at operation 510. The power limit can be determined in the same manner, or a substantially similar manner, to operation 410 of FIG. 4. A determination is then made whether the new device will exceed the power limit. This is illustrated at operation 515. Determining whether the new device will exceed the power limit can be completed the same as, or substantially similar to, operation 415 of FIG. 4 (e.g., by comparing the predicted load, considering the addition of the new device, to the power limit).

If a determination is made that the addition of the new device does not exceed the power limit, then power is provided to the new device. This is illustrated at operation 520. Power can be provided to the new device in the same manner, or a substantially similar manner, to operation 420 of FIG. 4. After power is provided to the new device, method 500 terminates.

If a determination is made that the new device will exceed the power limit, a determination is made whether the new device is higher priority than any currently connected devices. This is illustrated at operation 525. As discussed above, the RFID power data of each device can include a priority value. The priority value can indicate the relative importance of each device, such that if the power distributor reaches capacity, the power distribution can be altered (e.g., prioritized) according to the priority values stored in each respective RFID tag. In some embodiments, a high priority value (e.g., 100 on a scale from 1-100) indicates that a particular device is high priority. Conversely, in some embodiments, a low priority value (e.g., 1 on a scale from 1-100) indicates that a particular device is high priority. The magnitude/range of the priority value scale can vary.

As an example, assume the priority scale spans from 0-10, with 10 being the highest priority value (e.g., a device with a priority value of 10 is important and thus should be prioritized power over any lower priority devices if the power limit is exceeded) and 0 being the lowest priority value (e.g., a device with a priority value of 0 is not important and thus should not be prioritized power over any higher priority devices if the power limit is exceeded). In this example, if the new device has a priority value of 7, and each connected device has a priority value from 8-10, then a determination can be made that the new device does not have a priority value higher than any currently connected devices. Alternatively, if the new device has a priority value of 7, and at least one of the already connected devices has a priority value from 0-6, then a determination can be made that the new device has a priority value higher than at least one of the already connected devices.

If a determination is made that the new device does not have a higher priority value than any currently connected devices, then power is not provided to the new device. This is illustrated at operation 530. In embodiments, not providing power to the new device can be completed the same as, or substantially similar to, operation 425 of FIG. 4. Method 500 can then terminate.

If a determination is made that the new device has a higher priority than at least one of the currently connected devices, then the lowest priority device(s) which allow the predicted power load to remain below the power limit (considering the power draw of the new device) are disconnected, and the new device is provided power. This is illustrated at operation 535. This allows the new device to be provided power while ensuring the power limit is not exceeded.

As an example, assume the power limit of the power distributor is defined as 1000 W. Further, assume four devices are currently connected to the power distributor. A first connected device draws 200 W and has a priority value of 9 (e.g., on a scale of 0-10 with 10 being the highest priority), a second connected device draws 250 W and has a priority value of 5, a third connected device draws 150 W and has a priority value of 4, and a fourth connected device draws 300 W and has a priority value of 8 (as indicated by the RFID power data of each respective device). Thus, the current load on the power distributor is 900 W. A new device is plugged into the power distributor. The RFID power data associated with the new device indicates that the new device draws 300 W and has a priority value of 7. The addition of the new device brings the predicted load above the power limit (e.g., as the predicted load is 1,200 W and the power limit is 1,000 W). Accordingly, the devices which are lower priority than the newly connected device which allow the predicted load to remain below the power limit are disconnected (starting with the lowest priority device), and the new device is provided power. In this example, the third device can be disconnected first, as it has the lowest priority value. However, the disconnection of the third device still does not bring the predicted load below the power limit (e.g., as the predicted load is 1050 W upon the disconnection of the third device). As a result, the second device is also disconnected, bringing the predicted load (accounting for the new device) down to 800 W, below the power limit. The new device can then be provided power (e.g., similar to operation 520).

In an alternative example, only the second device may be disconnected (e.g., bringing the predicted load down to 950 W). Instead of disconnecting devices starting with the lowest priority and working up, a minimum number of lower priority disconnects can be completed which permit the predicted load to remain below the power limit. In this example, a determination can be made that only the second device is required to be disconnected to bring the predicted load down to a suitable level such that the new device can be provided power. Upon providing power to the newly connected device, method 500 can terminate.

The aforementioned operations can be completed in any order and are not limited to those described. Additionally, some, all, or none of the aforementioned operations can be completed, while still remaining within the spirit and scope of the present disclosure. For example, in some embodiments, operations 525 and 535 may not be completed. In these embodiments, if the addition of the new device exceeds the power limit, power is not provided to the new device.

Figure 6:
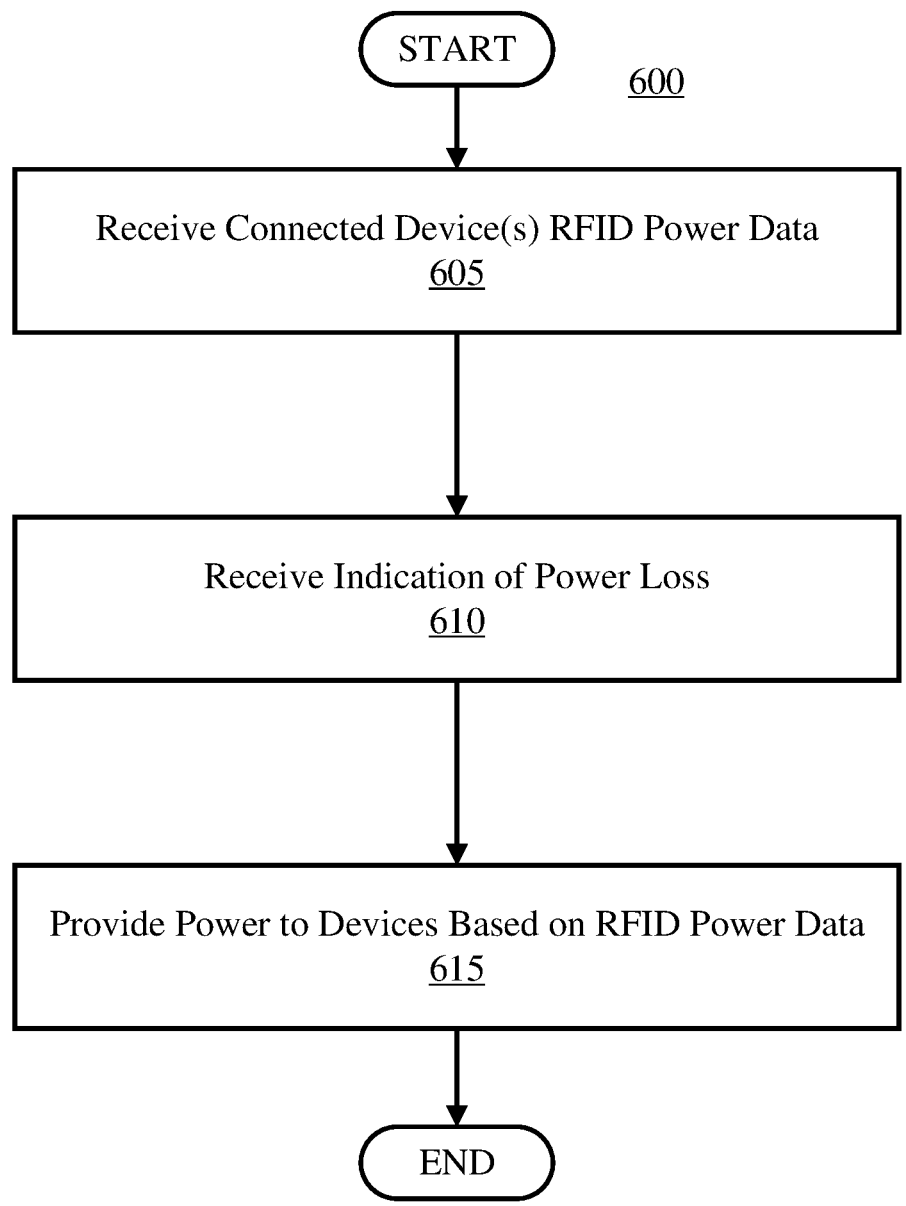
FIG. 6 is a flow diagram illustrating a method for providing power to one or more devices connected to an uninterruptible power supply based on RFID power data, in accordance with embodiments of the present disclosure.

Referring now to FIG. 6, shown is a flow diagram illustrating a method 600 for providing power to devices connected to an uninterruptible power supply (UPS) when a power loss occurs, in accordance with embodiments of the present disclosure. Method 600 initiates where RFID power data is received for connected devices. This is illustrated at operation 605. The RFID power data can be the same as, or substantially similar to, the RFID power data described with respect to FIGS. 1-5. In embodiments, the RFID power data can include safe shutdown data for respective devices. For example, the RFID power data can indicate whether a safe shutdown is required and/or the time/power (e.g., energy) required to complete a safe shutdown for respective devices. This data can be used to provide proper power to connected devices when power is lost such that the devices can complete a safe shutdown, if required.

An indication of power loss is received. This is illustrated at operation 610. In response to the indication of power loss, energy is provided to the connected devices based on the RFID power data. This is illustrated at operation 615. As an example, if RFID power data of a first device indicates that the first device requires 10 minutes of power at 300 W (e.g., 50 watt hours (Wh) of energy) to complete a safe shutdown, the first device can be allocated 300 W of power for 10 minutes. Similarly, if RFID power data of a second device indicates that the second device requires 3 minutes of power at 100 W (e.g., 5 Wh of energy) to complete a safe shutdown, the second device can be provided 3 minutes of power at 100 W. As another example, if a third device indicates that it requires no safe shutdown, the UPS may not provide any power to the third device once the power is lost, and the third device may abruptly lose power. After devices are provided power based on the RFID power data, method 600 terminates.

The aforementioned operations can be completed in any order and are not limited to those described. Additionally, some, all, or none of the aforementioned operations can be completed, while still remaining within the spirit and scope of the present disclosure. For example, in some embodiments, operations 605 and 610 can be interchangeable. That is, in response to an indication of power loss, RFID power data associated with respective devices can be received.

Figure 7:
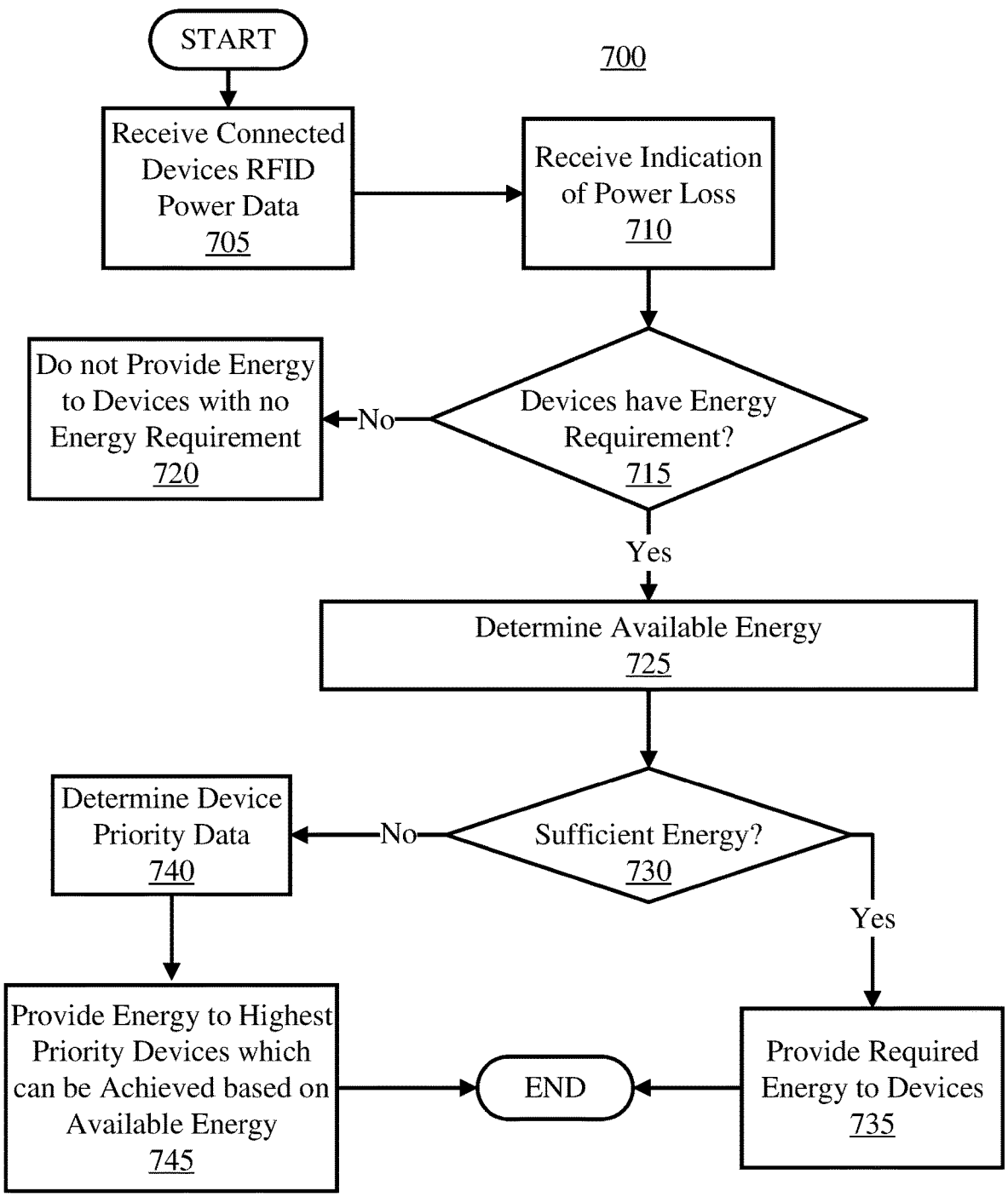
FIG. 7 is a flow diagram illustrating another method for providing power to one or more devices connected to an uninterruptible power supply based on RFID power data, in accordance with embodiments of the present disclosure.

Referring now to FIG. 7, shown is a flow diagram of an example method 700 for providing power to devices connected to a UPS in the event of a power loss, in accordance with embodiments of the present disclosure. Method 700 initiates at operation 705, where RFID power data is received for connected devices. The RFID power data can be the same as, or substantially similar to, the RFID power data described with respect to FIGS. 1-6. For example, the RFID power data can include power characteristics, importance indicators (e.g., priority values), safe shutdown data, etc. of respective devices. The RFID power data can be read by an RFID reader associated with the UPS.

An indication of power loss is then received. This is illustrated at operation 710. A determination is then made regarding which devices have an energy requirement (e.g., power is required after an indication of power loss). This is illustrated at operation 715. The RFID power data of each device can indicate whether a safe shutdown is required. For example, the RFID tag information stored in a non-volatile memory medium of each respective device (e.g., a device's plug) can indicate that a safe shutdown is required if a particular bit address is 1 and that a safe shutdown is not required if the particular bit address is 0. If a determination is made that there are devices with no energy requirement, then energy is not provided to any devices which do not require energy after an indication of power loss. This is illustrated at operation 720. As such, any devices which do not indicate that they require energy in the event of a power loss can abruptly lose power.

If a determination is made that there are devices which have an energy requirement, then the available energy of the UPS is determined. This is illustrated at operation 725. The available energy depends on the amount of energy stored in the UPS (e.g., in a battery of the UPS). The available energy can be specified in amp hours (Ah) or watt hours (Wh). The available energy can be determined by referencing a battery indicator or battery meter associated with a battery of the UPS.

A determination is then made whether there is sufficient energy to meet each device's energy requirements (e.g., specified in the RFID data). This is illustrated at operation 730. For example, assume a first device requires 50 W for 3 minutes (2.5 Wh), a second device requires 100 W for 3 minutes (5 Wh), and a third device requires 300 W for 10 minutes (50 Wh) (as specified in each device's RFID power data). Accordingly, the devices collectively require 57.5 Wh of energy. In this example, if the UPS has 60 Wh of available energy, a determination is made that there is sufficient energy to meet each device's energy requirements. Conversely if the UPS has 40 Wh of available energy, a determination is made that there is insufficient energy to meet each device's energy requirements.

If a determination is made that there is sufficient energy to meet each device's energy requirements, then energy is provided to the devices based on their energy requirements. This is illustrated at operation 735. Following the example above, the first device is provided 50 W for 3 minutes, the second device is provided 100 W for 3 minutes, and the third device is provided 300 W for 10 minutes.

If a determination is made that there is insufficient energy to meet each device's energy requirements, then priority data for each device is determined. This is illustrated at operation 740. The priority data included in each device's RFID tag can be referenced to determine which devices should be prioritized power. Energy is then provided to the highest priority devices which can be achieved based on the available energy. This is illustrated at operation 745. For example, assume a first device requires 60 Wh and has a priority value of 7 (e.g., on a priority scale from 0-10 with 10 being the highest priority), a second device requires 100 Wh and has a priority value of 4, a third device requires 200 Wh and has a priority value of 10, and a fourth device requires 150 Wh and has a priority value of 8. In this example, if the UPS has 400 Wh of available energy, then only the third and fourth devices would be provided power. This is because the first and second devices have the lowest priority values and would exceed the available energy if provided power.

The aforementioned example improves UPS functionality in situations where the amount of required energy for connected devices exceeds the available energy of a UPS when power is lost. For example, following the example above, if all four devices are provided power, then there is a possibility that none of the devices would be able to safely shut down (e.g., as the UPS could be depleted of power before each device safely shuts down). By prioritizing between devices, important devices can be safely shut down while other, less important devices, can be abruptly shut down.

With respect to the aforementioned figures, in embodiments, the RFID power data can be updated/reprogrammed as needed. For example, the RFID power data stored in a particular plug can be updated if the plug is switched to a new device. The RFID power data can be updated to reflect the power characteristics, importance, shutdown data, etc. of the new device. As another example, the RFID power data can be updated if characteristics of a device change. For example, assume a gaming computer draws 200 W of power when originally purchased (e.g., at a first time). The gaming computer is then upgraded at a later time (e.g., a new processor and graphics card are added to the gaming computer), such that the gaming computer now draws 400 W of power. The RFID power data can then be reprogrammed based on the increased power draw. As another example, the RFID power data can be updated based on measured power characteristics. For example, if the RFID power data indicates that a particular device draws 50 W of power, but a determination is made that the device actually draws 75 W based on testing via a power meter, the RFID power data can be updated to reflect the test data. As another example, assume RFID power data indicated that a particular device was low priority. Upon installing a particular program, the device is now critically important. The RFID power data can then be updated to reflect the change in importance (e.g., the priority value stored in the RFID power data can be increased).

Though the embodiments described herein refer to devices having RFID tags associated therewith, in embodiments, devices having no RFID tags can be coupled to one or more power distributors. In some embodiments, devices having no RFID tags (e.g., the power distributor cannot detect RFID power data) can automatically be denied power (e.g., the socket the device having no RFID is electrically coupled to can be closed). In some embodiments, devices having no RFID tags can automatically be provided power (e.g., for backwards compatibility). In some embodiments, devices having no RFID tags can trigger a warning (e.g., a notification such as lighting an LED light, sounding an alarm, etc.) upon electrical coupling to the power distributor (e.g., to warn a user of uncertain power characteristics).

Figure 8:
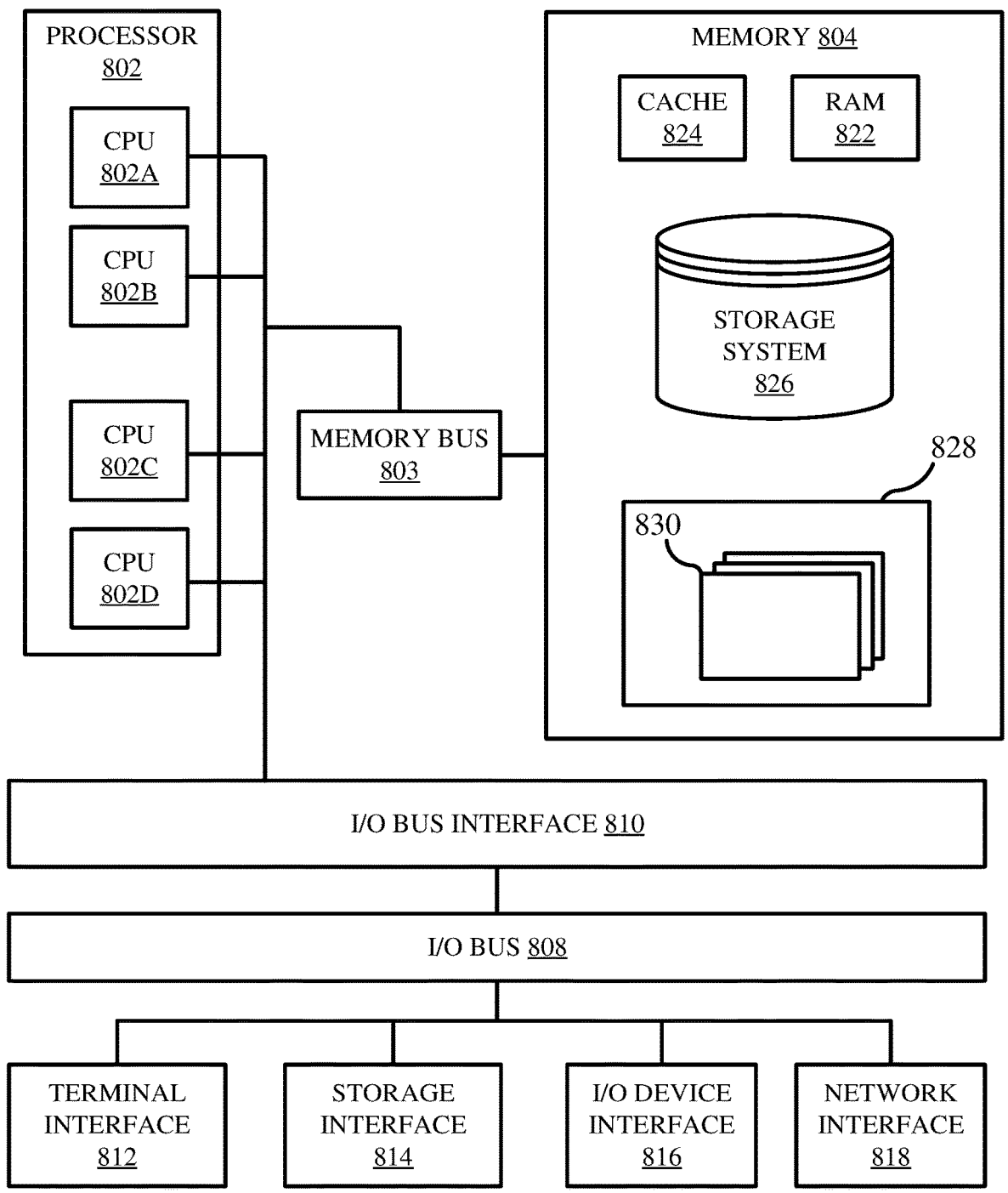
FIG. 8 is a high-level block diagram illustrating an example computer system that can be used in implementing one or more of the methods, tools, and modules, and any related functions, described herein, in accordance with embodiments of the present disclosure.

Referring now to FIG. 8, shown is a high-level block diagram of an example computer system 801 (e.g., power distributor 120 of FIG. 1 or power distributor 220 of FIG. 2) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 801 can comprise one or more CPUs 802, a memory subsystem 804, a terminal interface 812, a storage interface 814, an I/O (Input/Output) device interface 816, and a network interface 818, all of which can be communicatively coupled, directly or indirectly, for inter-component communication via a memory bus 803, an I/O bus 808, and an I/O bus interface unit 810.

The computer system 801 can contain one or more general-purpose programmable central processing units (CPUs) 802A, 802B, 802C, and 802D, herein generically referred to as the CPU 802. In some embodiments, the computer system 801 can contain multiple processors typical of a relatively large system; however, in other embodiments the computer system 801 can alternatively be a single CPU system. Each CPU 802 can execute instructions stored in the memory subsystem 804 and can include one or more levels of on-board cache.

System memory 804 can include computer system readable media in the form of volatile memory, such as random access memory (RAM) 822 or cache memory 824. Computer system 801 can further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 can include at least one program product having a set (e.g., at least one) of program modules that are configured to carry out the functions of various embodiments.

One or more programs/utilities 828, each having at least one set of program modules 830 can be stored in memory 804. The programs/utilities 828 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 828 and/or program modules 830 generally perform the functions or methodologies of various embodiments.

In some embodiments, the program modules 830 of the computer system 801 can include a power management module. The power management module can be configured to analyze RFID power data associated with RFID tags of various devices coupled to a power distributor. The power management module can then be configured to determine whether one or more actions (e.g., enabling/disabling current flow, issuing notifications, providing energy over time, etc.) should be issued based on the RFID power data of the devices.

Although the memory bus 803 is shown in FIG. 8 as a single bus structure providing a direct communication path among the CPUs 802, the memory subsystem 804, and the I/O bus interface 810, the memory bus 803 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 can, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices can be connected directly to one or more system I/O buses.

In some embodiments, the computer system 801 can be a multi-user mainframe computer system, a single-user system, or a server computer or similar device that has little or no direct user interface, but receives requests from other computer systems (clients). Further, in some embodiments, the computer system 801 can be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components can have greater or lesser complexity than as represented in FIG. 8, components other than or in addition to those shown in FIG. 8 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   reading, by a radio-frequency identification (RFID) reader, a first set of RFID power data from a first RFID tag of a first device electrically coupled to a power supply, the first set of RFID power data specifying a first amount of energy required by the first device if a power loss occurs;
   reading, by the RFID reader, a second set of RFID power data from a second RFID tag of a second device electrically coupled to the power supply, the second set of RFID power data specifying that the second device does not require power if a power loss occurs;
   receiving an indication that the power loss occurred;
   providing, by the power supply, in response to the indication that the power loss occurred, the first amount of energy to the first device; and
   disabling, in response to the indication that the power loss occurred, a socket the second device is electrically coupled to.

2. The method of claim 1, wherein the second set of RFID power data specifies a second amount of energy required by the second device if a power loss occurs, the method further comprising:
   providing, by the power supply, in response to the indication that the power loss occurred, the second amount of energy to the second device.

3. The method of claim 1, wherein the second set of RFID power data specifies a second amount of energy required by the second device if a power loss occurs, the method further comprising:
   determining, prior to providing the first amount of energy to the first device, an amount of available energy of the power supply;
   determining that an addition of the first amount of energy and second amount of energy does not exceed the amount of available energy of the power supply; and
   providing, in response to determining that the addition of the first amount of energy and the second amount of energy does not exceed the amount of available energy of the power supply, the first amount of energy to the first device and the second amount of energy to the second device.

4. The method of claim 1, wherein the second set of RFID power data specifies a second amount of energy required by the second device if a power loss occurs, the method further comprising:
   reading, prior to receiving the indication that the power loss occurred, by the RFID reader, a third set of RFID power data from a third RFID tag of a third device electrically coupled to the power supply, the third set of RFID power data specifying a third amount of energy required by the third device if a power loss occurs;
   determining, prior to providing the first amount of energy to the first device, an amount of available energy of the power supply;
   determining that an addition of the first amount of energy, the second amount of energy, and the third amount of energy exceeds the amount of available energy of the power supply;
   determining, in response to determining that the addition exceeds the amount of available energy of the power supply, a first priority value for the first device indicated in the first set of RFID power data, a second priority value for the second device indicated in the second set of RFID power data, and a third priority value for the third device indicated in the third set of RFID power data;
   determining, in response to comparing the first priority value, second priority value, and third priority value, that the first priority value is the highest priority value; and
   providing, in response to determining that the first priority value is the highest priority value, the first amount of energy to the first device.

5. The method of claim 2, further comprising:
   determining, prior to providing the first amount of energy to the first device and the second amount of energy to the second device, an amount of available energy of the power supply;
   determining that an addition of the first amount of energy and second amount of energy exceeds the amount of available energy of the power supply; and
   providing the first amount of energy to the first device, wherein the second amount of energy is not provided to the second device.

6. The method of claim 5, wherein the first amount of energy is provided to the first device in response to a determination that a first priority value included in the first set of RFID power data is greater than a second priority value included in the second set of RFID power data.

7. A system comprising:
   a first device having a first radio-frequency identification (RFID) tag;
   a second device having a second RFID tag
   a third device having a third RFID tag; and
   a power distributor electrically coupled to the first second, and third devices, the power distributor having a memory, an RFID reader, and a processor, the power distributor configured to perform a method comprising:
      reading, by the RFID reader, the first RFID tag of the first device;
      determining, based on reading the first RFID tag, a first power draw of the first device;
      reading, by the RFID reader, the second RFID tag of the second device;
      determining, based on reading the second RFID tag, a second power draw of the second device;
      reading, by the RFID reader, the third RFID tag of the third device;
      determining, based on reading the third RFID tag, a third power draw of the third device;

determining, that an addition of the first power draw second power, and third power draw exceed a power limit of the power distributor; and providing power to the first and second devices and not the third device based on the first and second devices being higher priority than the third device.

8. The system of claim 7, wherein the first RFID tag is located in a first plug of the first device, wherein the second RFID tag is located in a second plug of the second device.

9. The system of claim 7, wherein power is not provided to the third device by closing a socket of the power distributor which the third device is electrically coupled to.

10. The system of claim 7, wherein providing power to the first and second devices includes opening a first socket which a first plug of the first device is coupled to and opening a second socket which a second plug of the second device is coupled to.

11. A computer program product comprising a computer readable storage medium having program instructions embodied therewith, the program instructions executable by a processor to cause the processor to perform a method comprising:

determining, by instructing a radio-frequency identification (RFID) reader to read a first RFID tag of a first device, a first voltage requirement of the first device;

determining a second voltage requirement of a power distributor;

determining that the first voltage requirement and second voltage requirement are different; and not providing, in response to the determination that the first voltage requirement and second voltage requirement are different, power to the first device electrically coupled to the power distributor, wherein power is not provided to the first device by disabling, via a switch, a socket the first device is electrically coupled to on the power distributor.

12. The computer program product of claim 11, wherein the method performed by the processor further comprises:

determining, by instructing the RFID reader to read a second RFID tag of a second device, a third voltage requirement of the second device;

determining that the second voltage requirement and third voltage requirement are the same; and providing, in response to the determination that the first voltage requirement and third voltage requirement are the same, power to the second device electrically coupled to the power distributor.

13. The computer program of claim 11, wherein the method performed by the processor further comprises:

determining, based on the reading of the first RFID tag, a first frequency requirement of the first device;

determining that the first frequency requirement is the same as a second frequency requirement of the power distributor; and providing, in response to determining that the first and second frequency requirements are the same, power to the first device.

14. The computer program product of claim 11, wherein the first RFID tag is located in a first plug of the first device.

* * * * *